(12) United States Patent
Bittar et al.

(10) Patent No.: US 8,274,289 B2
(45) Date of Patent: Sep. 25, 2012

(54) ANTENNA COUPLING COMPONENT MEASUREMENT TOOL HAVING ROTATING ANTENNA CONFIGURATION

(75) Inventors: Michael Bittar, Houston, TX (US); Guoyu Hu, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 755 days.

(21) Appl. No.: 12/294,557

(22) PCT Filed: Dec. 15, 2006

(86) PCT No.: PCT/US2006/062149
§ 371 (c)(1),
(2), (4) Date: Sep. 25, 2008

(87) PCT Pub. No.: WO2008/076130
PCT Pub. Date: Jun. 26, 2008

(65) Prior Publication Data
US 2009/0230968 A1 Sep. 17, 2009

(51) Int. Cl.
*G01V 3/08* (2006.01)
*G01V 3/10* (2006.01)
(52) U.S. Cl. ....................... 324/338; 324/343
(58) Field of Classification Search .......... 324/337–338, 324/343, 366, 369, 371
See application file for complete search history.

(56) References Cited

U.S. PATENT DOCUMENTS

| | | |
|---|---|---|
| 2,901,689 A | 8/1959 | Barrett |
| 3,014,177 A | 12/1961 | Hungerford et al. |
| 3,187,252 A | 6/1965 | Hungerford |
| 3,510,757 A | 5/1970 | Huston |
| 3,539,911 A | 11/1970 | Youmans et al. |
| 3,808,520 A | 4/1974 | Runge |
| 3,982,176 A | 9/1976 | Meador |
| 4,302,722 A | 11/1981 | Gianzero |
| 4,319,191 A | 3/1982 | Meador et al. |
| 4,360,777 A | 11/1982 | Segesman |
| 4,536,714 A | 8/1985 | Clark |
| 4,553,097 A | 11/1985 | Clark |
| 4,611,173 A | 9/1986 | Bravenec et al. |

(Continued)

FOREIGN PATENT DOCUMENTS
EP 0527089 2/1993
(Continued)

OTHER PUBLICATIONS

"Canadian Office Action", dated Jun. 7, 2005, Application No. 2,415,563, "Electromagnetic Wave Resistivity Tool With a Tilted Antenna", filed Jul. 10, 2001.

(Continued)

*Primary Examiner* — Bot Ledynh
(74) *Attorney, Agent, or Firm* — Krueger Iselin LLP

(57) ABSTRACT

Disclosed herein are electromagnetic resistivity logging systems and methods that employ an antenna configuration having at most two transmitter or receiver antenna orientations that rotate relative to the borehole. The measurements made by this reduced-complexity antenna configuration enable the determination of at least seven components of a coupling matrix, which may be determined using a linear system of equations that express the azimuthal dependence of the measurements. For increased reliability, measurement averaging may be performed in azimuthally spaced bins. The coupling matrix components can then be used as the basis for determining logs of various formation parameters, including vertical resistivity and anisotropy.

9 Claims, 4 Drawing Sheets

U.S. PATENT DOCUMENTS

| | | |
|---|---|---|
| 4,636,731 A | 1/1987 | Savage et al. |
| 4,651,101 A | 3/1987 | Barber et al. |
| 4,697,190 A | 9/1987 | Oswald |
| 4,780,857 A | 10/1988 | Lyle et al. |
| 4,785,247 A | 11/1988 | Meador et al. |
| 4,808,929 A | 2/1989 | Oldigs |
| RE32,913 E | 4/1989 | Clark |
| 4,845,433 A | 7/1989 | Kleinberg |
| 4,873,488 A | 10/1989 | Barber et al. |
| 4,899,112 A | 2/1990 | Clark et al. |
| 4,933,640 A | 6/1990 | Kuckes |
| 4,940,943 A | 7/1990 | Bartel et al. |
| 4,945,987 A | 8/1990 | Wittrisch |
| 4,949,045 A | 8/1990 | Clark et al. |
| 4,980,643 A | 12/1990 | Gianzero et al. |
| 5,089,779 A | 2/1992 | Rorden |
| 5,115,198 A | 5/1992 | Gianzero et al. |
| 5,200,705 A | 4/1993 | Clark et al. |
| 5,210,495 A | 5/1993 | Hapashey et al. |
| 5,230,386 A | 7/1993 | Wu et al. |
| 5,241,273 A | 8/1993 | Luling |
| 5,260,662 A | 11/1993 | Rorden |
| 5,278,507 A | 1/1994 | Bartel et al. |
| 5,329,448 A | 7/1994 | Rosthal |
| 5,332,048 A | 7/1994 | Underwood et al. |
| 5,389,881 A | 2/1995 | Bittar et al. |
| 5,402,068 A | 3/1995 | Meador et al. |
| 5,442,294 A | 8/1995 | Rorden |
| 5,508,616 A | 4/1996 | Sato et al. |
| 5,530,358 A | 6/1996 | Wisler et al. |
| 5,550,473 A | 8/1996 | Klein |
| 5,563,512 A | 10/1996 | Mumby |
| 5,594,343 A | 1/1997 | Clark et al. |
| 5,656,930 A | 8/1997 | Hagiwara |
| 5,720,355 A | 2/1998 | Lamine et al. |
| 5,757,191 A | 5/1998 | Gianzero |
| 5,781,436 A | 7/1998 | Forgang et al. |
| 5,854,991 A | 12/1998 | Gupta et al. |
| 5,886,526 A | 3/1999 | Wu |
| 5,892,460 A | 4/1999 | Jerabek et al. |
| 5,923,170 A | 7/1999 | Kuckes |
| 5,999,883 A | 12/1999 | Gupta et al. |
| 6,044,325 A | 3/2000 | Chakravarthy et al. |
| 6,084,826 A | 7/2000 | Leggett, III |
| 6,147,496 A | 11/2000 | Strack et al. |
| 6,163,155 A | 12/2000 | Bittar |
| 6,181,138 B1 | 1/2001 | Hagiwara et al. |
| 6,191,586 B1 | 2/2001 | Bittar |
| 6,218,841 B1 | 4/2001 | Wu |
| 6,218,842 B1 | 4/2001 | Bittar |
| 6,297,639 B1 | 10/2001 | Clark et al. |
| 6,304,086 B1 | 10/2001 | Minerbo et al. |
| 6,351,127 B1 | 2/2002 | Rosthal et al. |
| 6,353,321 B1 | 3/2002 | Bittar |
| 6,359,438 B1 | 3/2002 | Bittar |
| 6,373,254 B1 | 4/2002 | Dion et al. |
| 6,476,609 B1 | 11/2002 | Bittar |
| 6,538,447 B2 | 3/2003 | Bittar |
| 6,541,979 B2 | 4/2003 | Omeragic |
| 6,566,881 B2 | 5/2003 | Omeragic et al. |
| 6,573,722 B2 | 6/2003 | Rosthal et al. |
| 6,614,229 B1 | 9/2003 | Clark et al. |
| 6,777,940 B2 | 8/2004 | Macune |
| 6,810,331 B2 | 10/2004 | Bittar et al. |
| 6,863,127 B2 | 3/2005 | Clark et al. |
| 6,885,943 B2 | 4/2005 | Bittar et al. |
| 6,900,640 B2 | 5/2005 | Fanini et al. |
| 6,911,824 B2 | 6/2005 | Bittar |
| 6,944,546 B2 | 9/2005 | Xiao et al. |
| 7,019,528 B2 | 3/2006 | Bittar |
| 7,038,455 B2 | 5/2006 | Beste et al. |
| 7,046,010 B2 | 5/2006 | Hu et al. |
| 7,138,803 B2 | 11/2006 | Bittar |
| 7,227,363 B2 | 6/2007 | Gianzero et al. |
| 7,265,552 B2 | 9/2007 | Bittar |
| 7,394,257 B2 | 7/2008 | Martinez et al. |
| 7,657,377 B2 | 2/2010 | Sinclair et al. |
| 7,948,238 B2 | 5/2011 | Bittar |
| 8,085,049 B2 | 12/2011 | Bittar et al. |
| 8,085,050 B2 | 12/2011 | Bittar et al. |
| 2003/0051914 A1 | 3/2003 | Bittar |
| 2003/0055565 A1 | 3/2003 | Omeragic |
| 2003/0076107 A1 | 4/2003 | Fanini et al. |
| 2003/0229450 A1* | 12/2003 | Strickland ............... 702/10 |
| 2004/0059513 A1 | 3/2004 | Bittar et al. |
| 2004/0196047 A1 | 10/2004 | Fanini et al. |
| 2005/0024060 A1 | 2/2005 | Bittar |
| 2005/0083063 A1 | 4/2005 | Omeragic et al. |
| 2005/0134280 A1 | 6/2005 | Bittar et al. |
| 2005/0140373 A1 | 6/2005 | Li et al. |
| 2006/0011385 A1 | 1/2006 | Seydoux et al. |
| 2006/0015256 A1 | 1/2006 | Hassan et al. |
| 2006/0125479 A1 | 6/2006 | Chemali et al. |
| 2006/0244455 A1 | 11/2006 | Bittar |
| 2008/0018895 A1 | 1/2008 | Opsal |
| 2008/0136419 A1 | 6/2008 | Seydoux et al. |
| 2011/0019501 A1 | 1/2011 | Market |
| 2011/0221443 A1 | 9/2011 | Bittar et al. |

FOREIGN PATENT DOCUMENTS

| | | |
|---|---|---|
| EP | 0814349 | 12/1997 |
| EP | 0840142 | 5/1998 |
| RU | 2279697 | 10/2003 |
| RU | 2305300 | 8/2007 |
| WO | WO 9800733 | 1/1998 |
| WO | WO 0041006 | 7/2000 |
| WO | WO 0155748 | 8/2001 |

OTHER PUBLICATIONS

"Canadian Office Action", dated Jan. 23, 2009, Application No. 2,415,563, "Electromagnetic Wave Resistivity Tool With a Tilted Antenna", filed Jan. 10, 2001.

"Canadian Office Action", dated Jan. 29, 2007, Application No. 2,415,563, "Electromagnetic Wave Resistivity Tool With a Tilted Antenna", filed Jul. 10, 2001.

"Canadian Office Action", dated Jul. 21, 2003, Appl No. 2,359,371, "Electromagnetic Wave Resistivity Tool Having a Tilted Antenna for Determining the Horizontal and Vertical Resistivities and Relative Dip Angle in Anisotropic Earth Formations", Jan. 24, 2000.

"Canadian Office Action", dated Nov. 1, 2007, Application No. 2,415,563, "Electromagnetic Wave Resistivity Tool With a Tilted Antenna", filed Jan. 10, 2001.

"European Office Action", dated Jul. 17, 2006, Appl No. 01962294.3, "Electromagnetic Wave Resistivity Tool Having a Tilted Antenna for Determining the Horizontal and Vertical Resistivities and Relative Dip Angle in Anisotropic Earth Formations", filed Jul. 10, 2001.

"European Office Action", dated Apr. 29, 2008, Application No. 00908351.0, "Electromagnetic Wave Resistivity Tool Having Tilted Antenna", filed Jan. 24, 2000.

"European Office Action", dated Jul. 31, 2007, Application No. 00908351.0, "Electromagnetic Wave Resistivity Tool Having Tilted Antenna", filed Jan. 24, 2000.

"European Office Action", dated Sep. 13, 2007, Application No. 01962294.3, "Electromagnetic Wave Resistivity Tool Having a Tilted Antenna for Determining the Horizontal and Vertical Resistivities and Relative Dip Angle in Anisotropic Earth Formations", filed Jul. 10, 2001.

"European Office Action", dated Sep. 23, 3008, Application No. 01096 294.3, Electromagnetic wave resistivity tool having a tilted antenna for determining the horizontal and vertical resistivities and relative dip angle in anisotropic earth formations Jul. 10, 2001.

"European Supplemental Search Report", dated Jun. 12, 2003 Application No. 00908351.0, "Electromagnetic Wave Resistivity Tool Having Tilted Antenna", filed Jan. 24, 2000.

"Eurpoean Office Action", dated Sep. 27, 2005, Application No. 01962294.3, "Electromagnetic Wave Resistivity Tool Having a Tilted Antenna for Determining the Horizontal and Vertical Resistivities and Relative Dip Angle in Anisotropic Earth Formations", filed Jul. 10, 2001.

Bell, C. et al., "Navigating and Imaging in Complex Geology With Azimuthal Propagation Resistivity While Drilling", 2006 SPE Annual Technical Conference and Exhibition, SPE 102637, San Antonio, TX, USA, (Sep. 24, 2006), pp. 1-14.

Bittar, Michael S., "Processing Resistivity Logs", U.S. Appl. No. 60/821,721, filed Aug. 8, 2006.

Bittar, Michael S., "Tool for Azimuthal Resistivity Measurement and Bed Boundary Detection", U.S. Appl. No. 60/821,988, filed Aug. 10, 2006.

Bittar, Michael S., et al., "A True Multiple Depth of Investigation Electromagnetic Wave Resistivity Sensor: Theory, Experiment, and Prototype Field Test Results", SPE 22705, 66th Annual Technical Conference and Exhibition of the SPE, Dallas, TX, (Oct. 6, 1991), pp. 1-8, plus 10 pgs of Figures.

Bittar, Michael S., et al., "Invasion Profiling with a Multiple Depth of Investigation, Electromagnetic Wave Resistivity Sensor", SPE 28425, 69th Annual Technical Conference and Exhibition of the SPE, New Orleans, LA, (Sep. 25, 1994), pp. 1-12, plus 11 pgs of Figures.

Bittar, Michael S., et al., "The Effects of Rock Anisotropy on MWD Electromagnetic Wave Resistivity Sensors", The Log Analyst, (Jan. 1996), pp. 20-30.

Bittar, Michael S., et al., "The Effects of Rock Anisotropy on MWD Electromagnetic Wave Resistivity Sensors", SPWLA 35th Annual Logging Symposium, (Jun. 19, 1994), 18 pgs.

Bittar, Michael S., "A New Azimuthal Deep-Reading Resistivity Tool for Geosteering and Advanced Formation Evaluation", 2007 SPE Annual Technical Conference and Exhibition, SPE 109971, Anaheim, CA, USA, (Nov. 11, 2007), pp. 1-9.

Bonner, S. et al., "A New Generation of Electrode Resistivity Measurements for Formation Evaluation While Drilling", SPWLA 35th Annual Logging Symposium, (Jun. 19, 1994), pp. 1-19.

Clark, Brian et al., "A Dual Depth Resistivity Measurement for Fewd", SPWLA 29th Annual Logging Symposium, (Jun. 1988), 25 pgs.

Clark, Brian et al., "Electromagnetic Propagation Logging While Drilling: Theory and Experiment", SPE Formation Evaluation, (Sep. 1990), pp. 263-271.

Hagiwara, T. "A New Method to Determine Horizontal-Resistivity in Anisotropic Formations Without Prior Knowledge of Relative Dip", 37th Annual SPWLA Logging Symposium, New Orleans, LA, (Jun. 16, 1996), pp. 1-5, plus 3 pgs of Figures.

Li, Qiming et al., "New Directional Electromagnetic Tool for Proactive Geosteering and Accurate Formation Evaluation While Drilling", SPWLA 46th Annual Logging Symposium, New Orleans, LA, USA, (Jun. 26, 2005), pp. 1-16.

Luling, M. et al., "Processing and Modeling 2-MHz Resistivity Tools in Dipping, Laminated, Anisotropic Formations: SPWLA", SPWLA 35th Annual Logging Symposium, paper QQ, (1994), pp. 1-25.

Mack, S. G., et al., "MWD Tool Accurately Measures Four Resistivities", Oil & Gas Journal, (May 25, 1992), pp. 1-5.

Mechetin, V. F., et al., "Temp—A New Dual Electromagnetic and Laterolog Apparatus—Technological Complex", All-Union Research Logging Institute, Ufa, USSR. Ch. Ostrander, Petro Physics Int'l, Dallas, Texas, USA, 17 pgs.

Meyer, W. H., "New Two Frequency Propagation Resistivity Tools", SPWLA 36th Annual Logging Symposium, (Jun. 26-29, 1995),12 pgs.

Rodney, Paul F., et al., "Electromagnetic Wave Resistivity MWD Tool", SPE Drilling Engineering, (Oct. 1986), pp. 37-346.

"PCT International Preliminary Examination Report", dated Nov. 14, 2002, Appl No. PCT/US01/41319 "Electromagnetic Wave Resistivity Tool Having a Tilted Antenna for Geosteering Within a Desired Payzone", filed Jul. 10, 2001, 30 pgs.

"PCT International Search Report and Written Opinion", dated May 15, 2000, Appl No. PCT/US00/01693, "Electromagnetic Wave Resistivity Tool Having a Tilted Antenna for Determining the Horizontal and Vertical Resistivities and Relative Dip Angle in Anisotropic Earth Formations", Jan. 24, 2000, 38 pgs.

"PCT International Search Report", dated Jan. 31, 2008, Appl No. PCT/US07/15806, "Modular Geosteering Tool Assembly", filed Jul. 11, 2007, 27 pgs.

"PCT International Search Report", dated Feb. 5, 2008, Appl No. PCT/US07/64221, "Robust Inversion Systems and Methods for Azimuthally Sensitive Resistivity Logging Tools", filed Mar. 16, 2007, 1 pg.

"PCT International Search Report", dated Feb. 27, 2008, Appl No. PCT/US07/75455, "Resistivity Logging with Reduced Dip Artifacts", filed Aug. 8, 2007, 18 pgs.

"PCT International Search Report", dated Apr. 30, 2008, Appl No. PCT/US06/62149, "Antenna Coupling Component Measurement Tool Having a Rotating Antenna Configuration", filed Dec. 15, 2006, 3 pgs.

"PCT International Search Report", dated May 15, 2002, Appl No. PCT/US00/01693, Electromagnetic Wave Resistivity Tool Having a Tilted Antenna for Determining the Horizontal and Vertical Resistivities and Relative Dip Angle in Anisotropic Earth Formations, Jan. 24, 2000, 4 pgs.

"PCT International Search Report", dated May 15, 2008, Appl No. PCT/US07/15744, "Method and Apparatus for Building a Tilted Antenna", filed Jul. 11, 2007, 2 pgs.

"PCT International Search Report", dated Sep. 18, 2001, Appl No. PCT/US01/41319 "Electromagnetic Wave Resistivity Tool Having a Tilted Antenna for Geosteering Within a Desired Payzone", filed Jul. 10, 2001, , pp. 1-5.

"PCT International Search Report", dated Sep. 18, 2001, Appl No. US01/41319, "Electromagnetic Wave Resistivity Tool Having a Tilted Antenna for Determining the Horizontal and Vertical Resistivities and Relative Dip Angle in Anisotropic Earth Formations", Aug. 6, 2002, 5 pgs.

"PCT Written Opinion", dated Aug. 6, 2002, Appl No. PCT/US01/41319, "Electromagnetic Wave Resistivity Tool Having a Tilted Antenna for Geosteering Within a Desired Payzone", filed Jul. 10, 2001, 5 pgs.

"US Advisory Action", dated Apr. 13, 2007, U.S. Appl. No. 11/457,709, "Electromagnetic Wave Resistivity Tool Having a Tilted Antenna for Geosteering Within a Desired Payzone", filed Jul. 14, 2006, 3 pgs.

"US Advisory Action", dated Sep. 15, 2005, U.S. Appl. No. 10/616,429, "Electromagnetic Wave Resistivity Tool Having a Tilted Antenna for Geosteering Within a Desired Payzone", filed Jul. 9, 2003, 14 pgs.

"US Final Office Action", dated Jan. 19, 2007, U.S. Appl. No. 11/457,709, "Electromagnetic Wave Resistivity Tool Having a Tilted Antenna for Geosteering Within a Desired Payzone", filed Jul. 14, 2006, 31 pgs.

"US Final Office Action", dated Jul. 7, 2011, U.S. Appl. No. 12/299,760, "Robust Inversion Systems and Methods for Azimuthally Sensitive Resistivity Logging Tools", filed Nov. 5, 2008, 16 pgs.

"US Final Office Action", dated Oct. 22, 2010, U.S. Appl. No. 12/467,434, "Electromagnetic Wave Resistivity Tool Having a Tilted Antenna for Geosteering Within a Desired Payzone", filed May 18, 2009, 19 pgs.

"US Non-Final Office Action", dated Apr. 26, 2000, Application No. 09/23832, "Electromagnetic Wave Resistivity Tool Having a Tilted Antenna for Determining the Horizontal and Vertical Resistivities and Relative Dip Angle in Anisotropic Earth Formations", filed Jan. 28, 1999, 8 pgs.

"US Non-Final Office Action", dated Jun. 6, 2005, U.S. Appl. No. 10/616,429, Electromagnetic Wave Resistivity Tool Having a Tilted Antenna for Geosteering Within a Desired Payzone, filed Jul. 9, 2003, 27 pgs.

"US Non-Final Office Action", dated Jun. 16, 2004, U.S. Appl. No. 10/255,048, "Electromagnetic Wave Resistivity Tool Having a Tilted Antenna for Determining the Horizontal and Vertical Resistivities and Relative Dip Angle in Anisotropic Earth", filed Sep. 25, 2002, 8 pgs.

"US Non-Final Office Action", dated Jul. 28, 2003, U.S. Appl. No. 10/255,048, "Electromagnetic Wave Resistivity Tool Having a Tilted Antenna for Determining the Horizontal and Vertical Resistivities and Relative Dip Angle in Anisotropic Earth Formations", filed Sep. 25, 2002, 6 pgs.

"US Non-Final Office Action", dated Aug. 18, 2006, U.S. Appl. No. 11/457,709, "Electromagnetic Wave Resistivity Tool Having a Tilted Antenna for Geosteering Within a Desired Payzone", filed Jul. 14, 2006, 13 pgs.

"US Non-Final Office Action", dated Aug. 26, 2004, Application No. Jul. 9, 2003, "Electromagnetic Wave Resistivity Tool Having a Tilted Antenna for Geosteering Within a Desired Payzone", filed Jul. 9, 2003, 11 pgs.

"US Non-Final Office Action", dated Sep. 6, 2007, U.S. Appl. No. 11/745,822, Electromagnetic Wave Resistivity Tool Having a Tilted Antenna for Geosteering Within a Desired Payzone:, filed May 8, 2007, 31 pgs.

"US Non-Final Office Action", dated Dec. 21, 2005, U.S. Appl. No. 11/198,066, "Electromagnetic Wave Resistivity Tool Having a Tilted Antenna for Determining the Horizontal and Vertical Resistivities and Relative Dip Angle in Anisotropic Earth", filed Aug. 5, 2005, 15 pgs.

Chinese Office Action, dated Jul. 12, 2011, Appl No. 200680054943.6, "Antenna Coupling Component Measurement Tool Having a Rotating Antenna Configuration", filed Dec. 9, 2008, 13 pgs.

Moran, J. H. et al., "Effects of formation anisotropy on resistivity-logging measurements", Geophysics, vol. 44, No. 7 (Jul. 1979): p. 1266-1286, 21 Figs., 4 Tables, 21 pgs.

US Non-Final Office Action, dated Jul. 18, 2011, U.S. Appl. No. 12/306,954, "Method and Apparatus for Building a Tilted Antenna", filed Dec. 30, 2008, 21 pgs.

US Final Office Action, dated Nov. 17, 2011, U.S. Appl. No. 12/306,267, "Modular Geosteering Tool Assembly", filed Dec. 23, 2008, 14 pgs.

US Final Office Action, dated Dec. 8, 2011, U.S. Appl. No. 12/306,954, "Method and Apparatus for Building a Tilted Antenna", filed Dec. 30, 2008, 17 pgs.

"US Non-Final Office Action", dated Jan. 27, 2012, U.S. Appl. No. 12/373,558, "Resistivity Logging with Reduced Dip Artifacts", filed Aug. 8, 2007, 17 pgs.

"US Non-Final Office Action", dated Mar. 5, 2012, U.S. Appl. No. 12/679,502, "Mulitmodal Geosteering Systems and Methods", filed Apr. 25, 2008, 14 pgs.

"US Final Office Action", dated Oct. 15, 2010, U.S. Appl. No. 12/467,427, "Electromagnetic Wave Resistivity Tool Having a Tilted Antenna for Determining the Horizontal and Vertical Resistivities and Relative Dip Angle in Anisotropic Earth Formations", filed May 18, 2009, 24 pgs.

"US Non-Final Office Action", dated Mar. 15, 2010, U.S. Appl. No. 12/467,427, "Electromagnetic Wave Resistivity Tool Having a Tilted Antenna for Determining the Horizontal and Vertical Resistivities and Relative Dip Angle in Anisotropic Earth Formations", filed May 18, 2009, 39 pgs.

"US Non-Final Office Action", dated Apr. 16, 2012, U.S. Appl. No. 12/689,435, "Tool for Azimuthal Resistivity Measurement and Bed Boundary Detection", filed Jan. 19, 2010, 6 pgs.

* cited by examiner

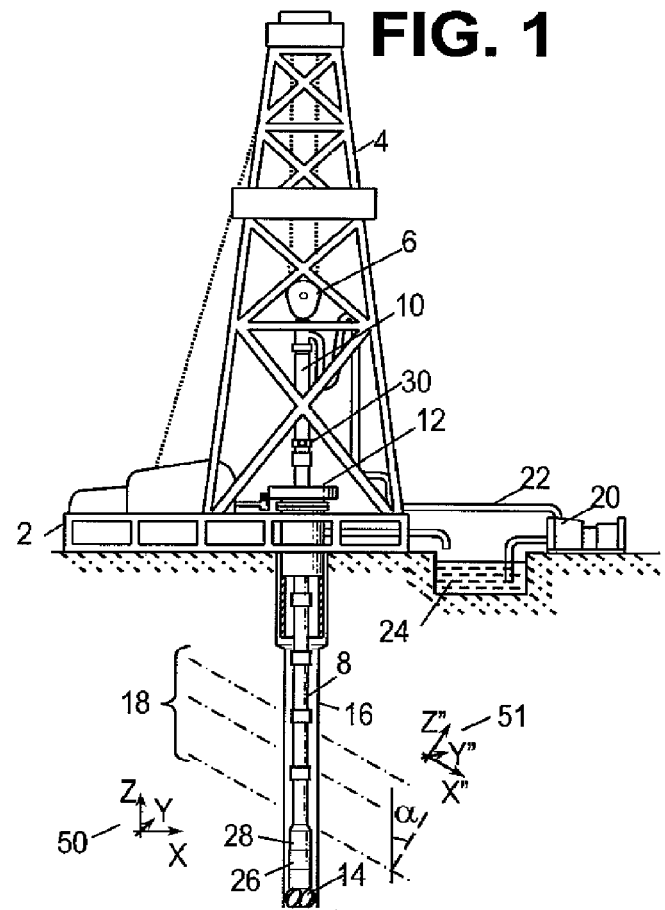
FIG. 1
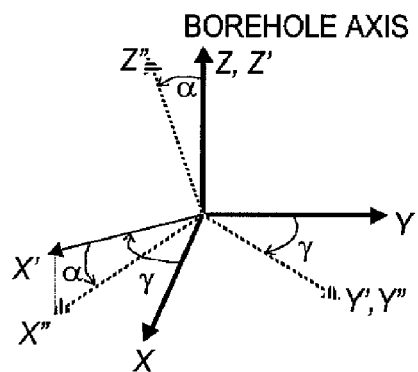
FIG. 3
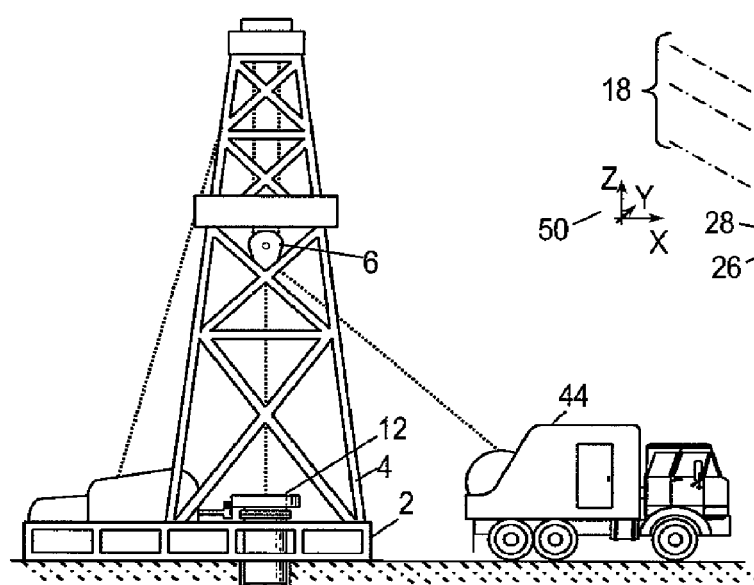
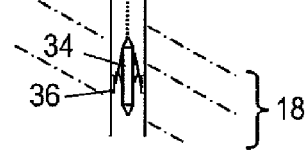
FIG. 2

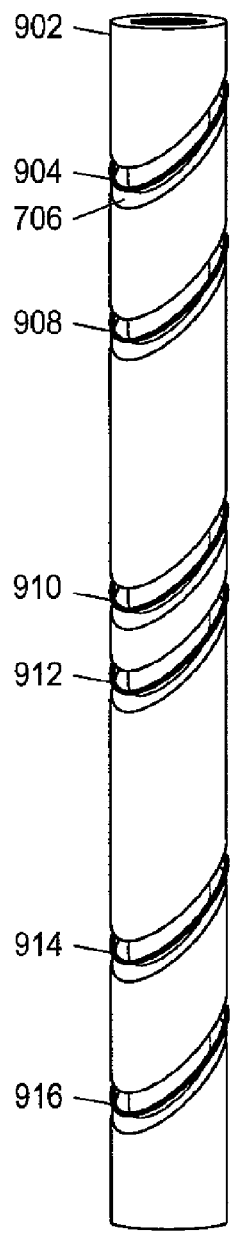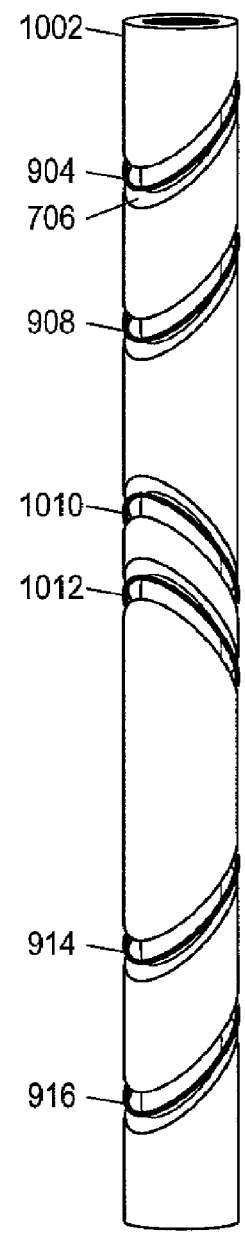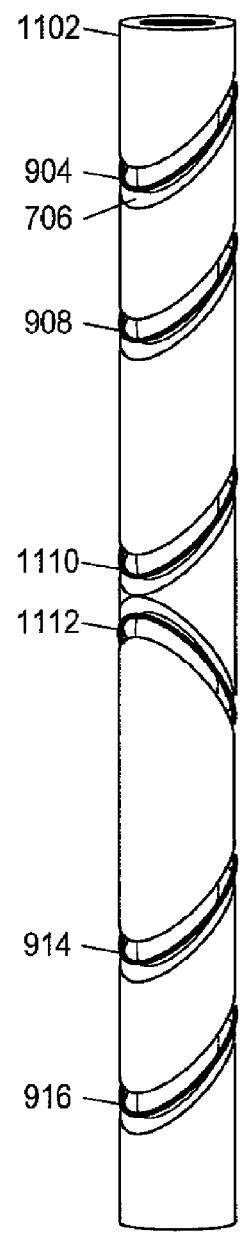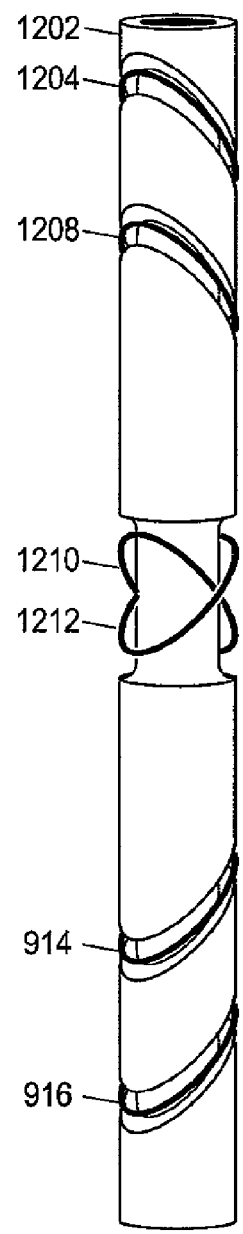
FIG. 9    FIG. 10    FIG. 11    FIG. 12

ANTENNA COUPLING COMPONENT MEASUREMENT TOOL HAVING ROTATING ANTENNA CONFIGURATION

BACKGROUND

The basic principles and techniques for electromagnetic logging for earth formations are well known. For example, induction logging to determine the resistivity (or its inverse, conductivity) of earth formations adjacent a borehole has long been a standard and important technique in the search for and recovery of subterranean petroleum deposits. In brief, a transmitter transmits an electromagnetic signal that passes through formation materials around the borehole and induces a signal in ore or more receivers. The amplitude and/or phase of the receiver signals are influenced by the formation resistivity, enabling resistivity measurements to be made. The measured signal characteristics and/or formation properties calculated therefrom are recorded as a function of the tool's depth or position in the borehole, yielding a formation log that can be used by analysts.

Note, however, that the resistivity of a given formation may be isotropic (equal in all directions) or anisotropic (unequal in different directions). In electrically anisotropic formations, the anisotropy is generally attributable to extremely fine layering during the sedimentary build-up of the formation. Hence, in a formation coordinate system oriented such that the x-y plane is parallel to the formation layers and the z axis is perpendicular to the formation layers, resistivities $R_X$ and $R_Y$ in directions x and y, respectively, tend to be the same, but resistivity $R_Z$ in the z direction is different. Thus, the resistivity in a direction parallel to the plane of the formation (i.e., the x-y plane) is known as the horizontal resistivity, $R_H$, and the resistivity in the direction perpendicular to the plane of the formation (i.e., the z direction) is known as the vertical resistivity, $R_V$. The index of anisotropy, $\eta$, is defined as $\eta=[R_V/R_H]^{1/2}$.

As a further complication to measuring formation resistivity, boreholes are generally not perpendicular to formation beds. The angle between the axis of the well bore and the orientation of the formation beds (as represented by the normal vector) has two components. These components are the dip angle and the strike angle. The dip angle is the angle between the borehole axis and the normal vector for the formation bed. The strike angle is the direction in which the boreholes axis "leans away from" the normal vector. (These will be defined more rigorously in the detailed description.)

Electromagnetic resistivity logging measurements are a complex function of formation resistivity, formation anisotropy, and the formation dip and strike angles, which may all be unknown. Logging tools that fail to account for one or more of these parameters may provide measurement quality that is less than ideal. Conversely, tools that can be used to measure each of these parameters will provide improved resistivity measurements. Moreover, tools that are able to provide dip and strike measurements along with azimuthal orientation information, can be used for geosteering. (Geosteering is a process in which drill engineers adjust the drilling direction to increase the borehole's exposure to a hydrocarbon-bearing formation (the "payzone").)

BRIEF DESCRIPTION OF THE DRAWINGS

A better understanding of the various disclosed embodiments can be obtained when the following detailed description is considered in conjunction with the following drawings, in which:

FIG. 1 shows an illustrative logging while drilling environment including dipping formation beds;

FIG. 2 shows an illustrative wireline logging environment including dipping formation beds;

FIG. 3 shows a relationship between the orientation of a borehole and a dipping formation bed;

FIG. 9 shows an illustrative electromagnetic resistivity logging tool having parallel tilted transmitter and receiver antennas;

FIG. 10 shows an illustrative electromagnetic resistivity logging tool having transmitters tilted at a first orientation and receiver antennas tilted at a second orientation;

FIG. 11 shows an illustrative electromagnetic resistivity logging tool having both parallel and non-parallel tilted transmitter and receiver antennas;

FIG. 12 shows an illustrative electromagnetic resistivity logging tool having co-located tilted receiver antennas;

Figure 4:
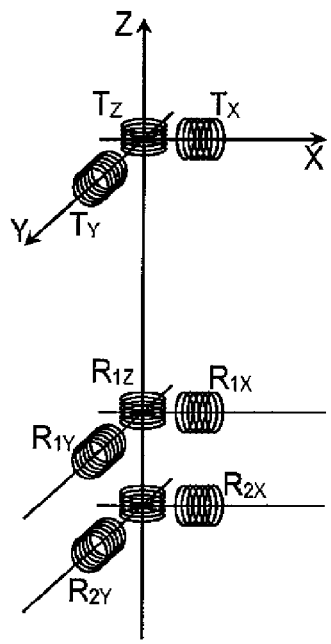
FIG. 4 shows a hypothetical antenna arrangement for a tool having an orthogonal triaxial transmitter and two orthogonal triaxial receivers.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the appended claims.

DETAILED DESCRIPTION

Disclosed herein are electromagnetic resistivity logging systems and methods that employ rotation of an azimuthally sensitive antenna configuration to obtain more elements of a coupling matrix than could be obtained from the static antenna configuration alone. Such exploitation of the rotation enables a complete antenna coupling matrix to be obtained with a tool having only two antenna orientations. With the complete antenna coupling matrix, the various resistivity measurement parameters can be measured, including formation resistivity, formation anisotropy, and formation dip and strike angles. Moreover, when the coupling matrix values are combined with orientation information from the tool, geosteering or boundary detection signals may be derived. Such benefits may be obtained with a reduced cost and greater reliability due to the reduced number of antennas.

The disclosed tool configurations and operations are best understood in the context of the larger systems in which they operate. Accordingly, an illustrative logging while drilling (LWD) environment is shown in FIG. 1. A drilling platform 2 supports a derrick 4 having a traveling block 6 for raising and lowering a drill string 8. A kelly 10 supports the drill string 8 as it is lowered through a rotary table 12. A drill bit 14 is driven by a downhole motor and/or rotation of the drill string 8. As bit 14 rotates, it creates a borehole 16 that passes through various formations 18. A pump 20 circulates drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole into the pit 24 and aids in maintaining the borehole integrity.

An electromagnetic resistivity logging tool 26 is integrated into the bottom-hole assembly near the bit 14. As the bit extends the borehole through the formations, logging tool 26 collects measurements relating to various formation properties as well as the tool orientation and position and various other drilling conditions. (The orientation measurements may be performed using an azimuthal orientation indicator, which may include magnetometers, inclinometers, and/or accelerometers, though other sensor types such as gyroscopes may be used. In some embodiments, the tool includes a 3-axis fluxgate magnetometer and a 3-axis accelerometer.) The logging tool 26 may take the form of a drill collar, i.e., a thick-walled tubular that provides weight and rigidity to aid the drilling process. A telemetry sub 28 may be included to transfer tool measurements to a surface receiver 30 and to receive commands from the surface receiver.

More preferably, rotational position indicator 70 may contain both a 3-axis fluxgate magnetometer and a 3-axis accelerometer. As is known in the art, the combination of those two sensor systems enables the measurement of the toolface, inclination, and azimuth orientation angles of the borehole. The toolface and hole inclination angles are calculated from the accelerometer sensor output. The magnetometer sensor outputs are used to calculate the hole azimuth. With the toolface, the hole inclination, and the hole azimuth information, a tool in accordance with the present invention can be used to steer the bit to the desirable bed. Specifically, the response difference or the response ratio can be used effectively to enter a desired payzone or to stay within the payzone of interest.

At various times during the drilling process, the drill string 8 may be removed from the borehole as shown in FIG. 2. Once the drill string has been removed, logging operations can be conducted using a wireline logging tool 34, i.e., a sensing instrument sonde suspended by a cable 42 having conductors for transporting power to the tool and telemetry from the tool to the surface. A resistivity imaging portion of the logging tool 34 may have centralizing arms 36 that center the tool within the borehole as the tool is pulled uphole. A logging facility 44 collects measurements from the logging tool 34, and includes computing facilities for processing and storing the measurements gathered by the logging tool.

FIG. 1 shows that the formations 18 are not perpendicular to the borehole, which may occur naturally or due to directional drilling operations. The borehole may have a coordinate system 50 defined in accordance with the borehole's long axis (the z axis) and the north side (or alternatively, the high side) of the hole (the x-axis). The formations 18, when characterized as a plane, may have a coordinate system 51 defined in accordance with the normal to the plane (the z" axis) and the direction of steepest descent (the x-axis). As shown in FIG. 3, the two coordinate systems are related by two rotations. Beginning with the borehole's coordinate system (x,y,z), a first rotation of angle γ is made about the z axis. The resulting coordinate system is denoted (x',y',z'). Angle γ is the relative strike angle, which indicates the direction of the formation dip relative to the borehole's coordinate system. A second rotation of angle α is then made about the y' axis. This aligns the borehole coordinate system with the formation coordinate system. Angle α is the relative dip angle, which is the slope angle of the beds relative to the long axis of the borehole.

The vertical resistivity is generally found to be the resistivity as measured perpendicular to the plane of the formation, and the horizontal resistivity is the resistivity as measured within the plane of the formation. Determination of each of these parameters (dip angle, strike angle, vertical resistivity, and horizontal resistivity) is desirable.

FIG. 4 shows a hypothetical antenna configuration for a multi-component electromagnetic resistivity logging tool. (The electromagnetic resistivity logging tool may be embodied as a wireline tool and as a logging while drilling tool.) A triad of transmitter coils $T_X$, $T_Y$ and $T_Z$, each oriented along a respective axis, is provided. At least one triad of similarly oriented receiver coils $R_{1X}$, $R_{1Y}$, and $R_{1Z}$ is also provided. For receive signal measurements relative to the amplitude and phase of the transmit signal (sometimes called "absolute" measurements), only one receiver triad would be used. A second triad of similarly oriented receiver coils pairs $R_{2X}$, $R_{2Y}$, and $R_{2Z}$ may also provided when differential measurements are desired (e.g., a signal amplitude ratio or a phase difference between receiver coils oriented along a given axis). Differential measurements may offer increased spatial resolution.

Moran and Gianzero, in "Effects of Formation Anisotropy on Resistivity Logging Measurements" Geophysics, Vol. 44, No. 7, p. 1266 (1979), noted that the magnetic field h in the receiver coils can be represented in terms of the magnetic moments m at the transmitters and a coupling matrix C:

$$h = Cm \quad (1)$$

In express form, equation (1) is:

$$\begin{bmatrix} H_x \\ H_y \\ H_z \end{bmatrix} = \begin{bmatrix} C_{xx} & C_{xy} & C_{xz} \\ C_{yx} & C_{yy} & C_{zz} \\ C_{zx} & C_{zy} & C_{zz} \end{bmatrix} \begin{bmatrix} M_x \\ M_y \\ M_z \end{bmatrix}, \quad (2)$$

where $M_X$, $M_Y$, and $M_Z$ are the magnetic moments (proportional to transmit signal strength) created by transmitters $T_X$, $T_Y$, and $T_Z$, respectively. $H_X$, $H_Y$, $H_Z$ are the magnetic fields (proportional to receive signal strength) at the receiver antennas $R_X$, $R_Y$, and $R_Z$, respectively.

In the antenna configuration of FIG. 4, if each transmitter is fired in turn, and signal measurements are made at each receiver in response to each firing, nine absolute or differential measurements are obtained. These nine measurements enable the determination of a complete coupling matrix C. ($C_{IJ} = a_{IJ} V_I^J$, where I is the index for receiver $R_X$, $R_Y$, or $R_Z$, J is the index for transmitter $T_X$, $T_Y$, or $T_Z$, $a_{IJ}$ is a constant determined by the tool design, and $V_I^J$ is a complex value representing the signal amplitude and phase shift measured by receiver I in response to the firing of transmitter J.) Knowledge of the complete coupling matrix enables the determination of dip angle, strike angle, vertical resistivity, and horizontal resistivity. A number of techniques may be used to determine these parameters. For example, dip and strike angle may be determined from coupling matrix values as explained by Li Gao and Stanley Gianzero, U.S. Pat. No. 6,727,706 "Virtual Steering of Induction Tool for Determination of Formation Dip Angle". Given these angles, vertical and horizontal resistivity can be determined in accordance with equations provided by Michael Bittar, U.S. Pat. No. 7,019,528 "Electromagnetic Wave Resistivity Tool Having a Tilted Antenna for Geosteering within a Desired Payzone". Alternatively, a simultaneous solution for these parameters may be found as described in the Bittar reference.

Figure 5:
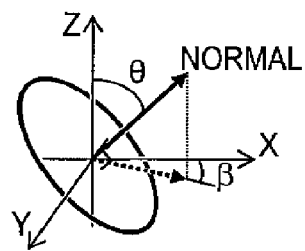
FIG. 5 shows angles for defining the orientation of a tilted antenna.

FIG. 5 shows two angles that may be used to specify the orientation of a coil antenna. The coil antenna may be considered as residing in a plane having a normal vector. Tilt angle θ is the angle between the longitudinal axis of the tool and the normal vector. Azimuth angle β is the angle between the projection of the normal vector in the X-Y plane and the tool scribe line. Alternatively, in the downhole context, azimuthal angle β may represent the angle between projection of the normal vector in the X-Y plane and the x-axis of the borehole coordinate system.

It is noted that three transmitter antenna orientations and three receiver antenna orientations are employed in the antenna configuration of FIG. 4. It has been discovered that when tool rotation is exploited, it is possible to determine the fill coupling matrix with only one transmitter and two receiver antenna orientations (or equivalently, one receiver and two transmitter antenna orientations). Moreover, with certain assumptions about the configuration of the formation, one transmitter and receiver antenna orientation may be sufficient.

Figure 6:
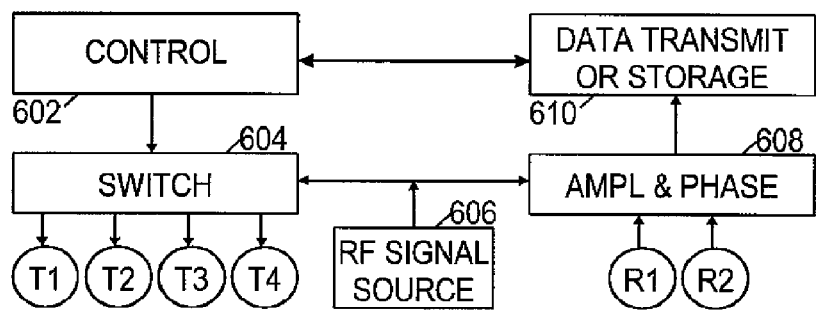
FIG. 6 is a block diagram of an illustrative electronics module for an electromagnetic resistivity tool.

Before considering various tools having specific antenna configurations, the electronics common to each tool are described. FIG. 6 shows a functional block diagram of the electronics for a resistivity tool. The electronics include a control module 602 that is coupled to an analog switch 604. Analog switch 604 is configured to drive any one of the transmitter coils $T_1$, $T_2$, $T_3$, $T_4$ with an alternating current (AC) signal from a signal source 606. In some embodiments, the signal source provides radio frequency signals. The control module 602 preferably selects a transmitter coil, pauses long enough for transients to die out, then signals data storage/transmit module 610 to accept an amplitude and phase sample of the signals received by each of the receivers. The control module 602 preferably repeats this process sequentially for each of the transmitters. The amplitude and phase shift values are provided by amplitude and phase shift detector 608 which is coupled to each of the receiver coils $R_1$ and $R_2$ for this purpose.

Control module 602 may process the amplitude and phase shift measurements to obtain compensated measurements and/or measurement averages. The raw, compensated, or averaged measurements, may be transmitted to the surface for processing to determine dip and strike angles, vertical and horizontal resistivity, and other information such as (i) distance to nearest bed boundary, (ii) direction of nearest bed boundary, and (iii) resistivity of any nearby adjacent beds. The data storage/transmitter module 610 may be coupled to telemetry unit 28 (FIG. 1) to transmit signal measurements to the surface. Telemetry unit 28 can use any of several known techniques for transmitting information to the surface, including but not limited to (1) mud pressure pulse; (2) hardwire connection; (3) acoustic wave; and (4) electromagnetic waves.

Figure 7:
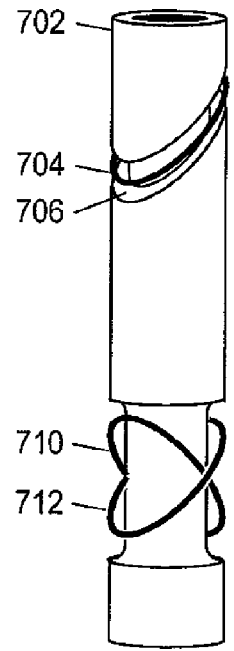
FIG. 7 shows an illustrative electromagnetic resistivity logging tool having tilted transmitter and receiver antennas.

FIG. 7 shows an electromagnetic resistivity logging tool 702 having only two receiver antenna orientations. The tool 702 is provided with one or more regions 706 of reduced diameter. A wire coil 704 is placed in the region 706 and in some embodiments is spaced away from the surface of subassembly 702 by a constant distance. To mechanically support and protect the coil 704, a non-conductive filler material (not shown) such as epoxy, rubber, or ceramic may be used in the reduced diameter regions 706. Coil 704 is a transmitter coil, and coils 710 and 712 are receiving coils. In operation, transmitter coil 704 transmits an interrogating electromagnetic signal which propagates through the borehole and surrounding formation. Receiver coils 710, 712 detect the interrogating electromagnetic signal and provide a measure of the electromagnetic signal's amplitude attenuation and phase shift. For differential measurements additional receiver coils parallel to coils 710, 712 may be provided at an axially-spaced distance. From the absolute or differential amplitude attenuation and phase shift measurements, the coupling matrix components can be determined and used as the basis for determining formation parameters and as the basis for geosteering.

The transmitter coil 704 may be spaced approximately 30 inches from the receiver coils 710, 712. The transmitter and receiver coils may comprise as little as one loop of wire, although more loops may provide additional signal power. The distance between the coils and the tool surface is preferably in the range from 1/16 inch to 3/4 inch, but may be larger. Transmitter coil 704 and receiver coil 712 may each have a tilt angle of about 45° and aligned with the same azimuth angle, while receiver coil 710 may have a tilt angle of about 45° and an azimuth 180° apart from receiver coil 712 (or equivalently, a tilt angle of minus 45° at the same azimuth angle as receiver coil 712).

The signal measured by a tilted receiver in response to the firing of a tilted transmitter can be expressed in terms of the signals $V_I^Y$ that would be measured by the tool of FIG. 4. When both transmitter and receiver coils are oriented at the same azimuth angle β, the tilted receiver signal $V_R$ is $$V_R = \begin{bmatrix} \sin\theta_T\cos\beta \\ \sin\theta_T\sin\beta \\ \cos\theta_T \end{bmatrix}^T \begin{bmatrix} V_x^x & V_x^y & V_x^z \\ V_y^x & V_y^y & V_y^z \\ V_z^x & V_z^y & V_z^z \end{bmatrix} \begin{bmatrix} \sin\theta_R\cos\beta \\ \sin\theta_R\sin\beta \\ \cos\theta_R \end{bmatrix} \quad (3)$$

where $\theta_T$ is the tilt angle of the transmitter and $\theta_R$ is the tilt angle of the receiver. In written-out form, the tilted receiver angle is:

$$V_R = \begin{bmatrix} V_x^x\sin\theta_T\sin\theta_R\cos^2\beta + V_y^x\sin\theta_T\sin\theta_R\sin\beta\cos\beta + \\ V_z^x\cos\theta_T\sin\theta_R\cos\beta + V_x^y\sin\theta_T\sin\theta_R\sin\beta\cos\beta + \\ V_y^y\sin\theta_T\sin\theta_R\sin^2\beta + V_z^y\cos\theta_T\sin\theta_R\sin\beta + \\ V_x^z\sin\theta_T\cos\theta_R\cos\beta + V_y^z\sin\theta_T\cos\theta_R\sin\beta + \\ V_z^z\cos\theta_T\cos\theta_R \end{bmatrix} \quad (4)$$

It is noted that the azimuth angle dependence for $V_y^x$ and $V_x^y$ is the same (sin β cos β), the dependence for $V_z^x$ and $V_x^z$ is the same (cos β), and the dependence for $V_z^y$ and $V_y^z$ is the same (sin β). It may be assumed that cross coupling components $V_y^x$ and $V_x^y$ are equal, but such an assumption is not desirable for the remaining cross components (at least not in dipping anisotropic beds). In that situation, the cross coupling components cannot be independently determined from a single rotating tilted transmitter-receiver pair such as transmitter coil 704 and receiver coil 712. (Note however that the diagonal elements can still be calculated.) A second transmitter or receiver coil (e.g., receiver coil 712) may be employed to provide an independent set of equations that enable the cross-coupling values to be determined.

A linear system of equations for the measurements made by rotating tool 702 is provided below. In deriving these equations, the borehole coordinate system is chosen so that the x-axis aligns with the dip azimuth of the surrounding formation, causing $V_y^x$ and $V_x^y$ to be zero. (The dip azimuth may be found by determining the azimuth angles at which the imaginary component of the receive signal reaches its minimum magnitude. Alternatively, these components can be assumed to be equal and can be retained in the linear system of equations.) The signals measured by receivers R1 (coil 712) and R2 (coil 710) at various azimuthal angles $\beta_1$-$\beta_N$ are:

$$V_{R1}(\beta_1) = \frac{1}{2}\begin{bmatrix} V_x^x\cos^2\beta_1 + V_z^x\cos\beta_1 + V_y^y\sin^2\beta_1 + \\ V_z^y\sin\beta_1 + V_x^z\cos\beta_1 + V_y^z\sin\beta_1 + V_z^z \end{bmatrix}, \quad (5.1)$$

$$V_{R1}(\beta_2) = \frac{1}{2}\begin{bmatrix} V_x^x\cos^2\beta_2 + V_z^x\cos\beta_2 + V_y^y\sin^2\beta_2 + \\ V_z^y\sin\beta_2 + V_x^z\cos\beta_2 + V_y^z\sin\beta_2 + V_z^z \end{bmatrix}, \quad (5.2)$$

...

$$V_{R1}(\beta_N) = \frac{1}{2}\begin{bmatrix} V_x^x\cos^2\beta_N + V_z^x\cos\beta_N + V_y^y\sin^2\beta_N + \\ V_z^y\sin\beta_N + V_x^z\cos\beta_N + V_y^z\sin\beta_N + V_z^z \end{bmatrix}, \quad (5.N)$$

$$V_{R2}(\beta_1) = \frac{1}{2}\begin{bmatrix} -V_x^x\cos^2\beta_1 - V_z^x\cos\beta_1 - V_y^y\sin^2\beta_1 - \\ V_z^y\sin\beta_1 + V_x^z\cos\beta_1 + V_y^z\sin\beta_1 + V_z^z \end{bmatrix}, \quad (5.N+1)$$

...

$$V_{R2}(\beta_N) = \frac{1}{2}\begin{bmatrix} -V_x^x\cos^2\beta_N - V_z^x\cos\beta_N - V_y^y\sin^2\beta_N - \\ V_z^y\sin\beta_N + V_x^z\cos\beta_N + V_y^z\sin\beta_N + V_z^z \end{bmatrix}. \quad (5.2N)$$

Figure 13:
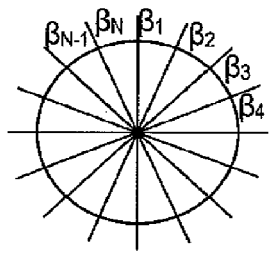
FIG. 13 shows the division of a borehore circumference into azimuthal bins.

Thus the linear system provided above has seven unknowns and 2N equations. It is expected that the tool would perform measurements for at least 10 different azimuthal angles, and may perform measurements for 16 or 32 evenly-divided azimuthal bins as shown in FIG. 13. The orthogonal voltage components $V_I^J$ can be readily determined using a linear least squares algorithm.

Figure 8:
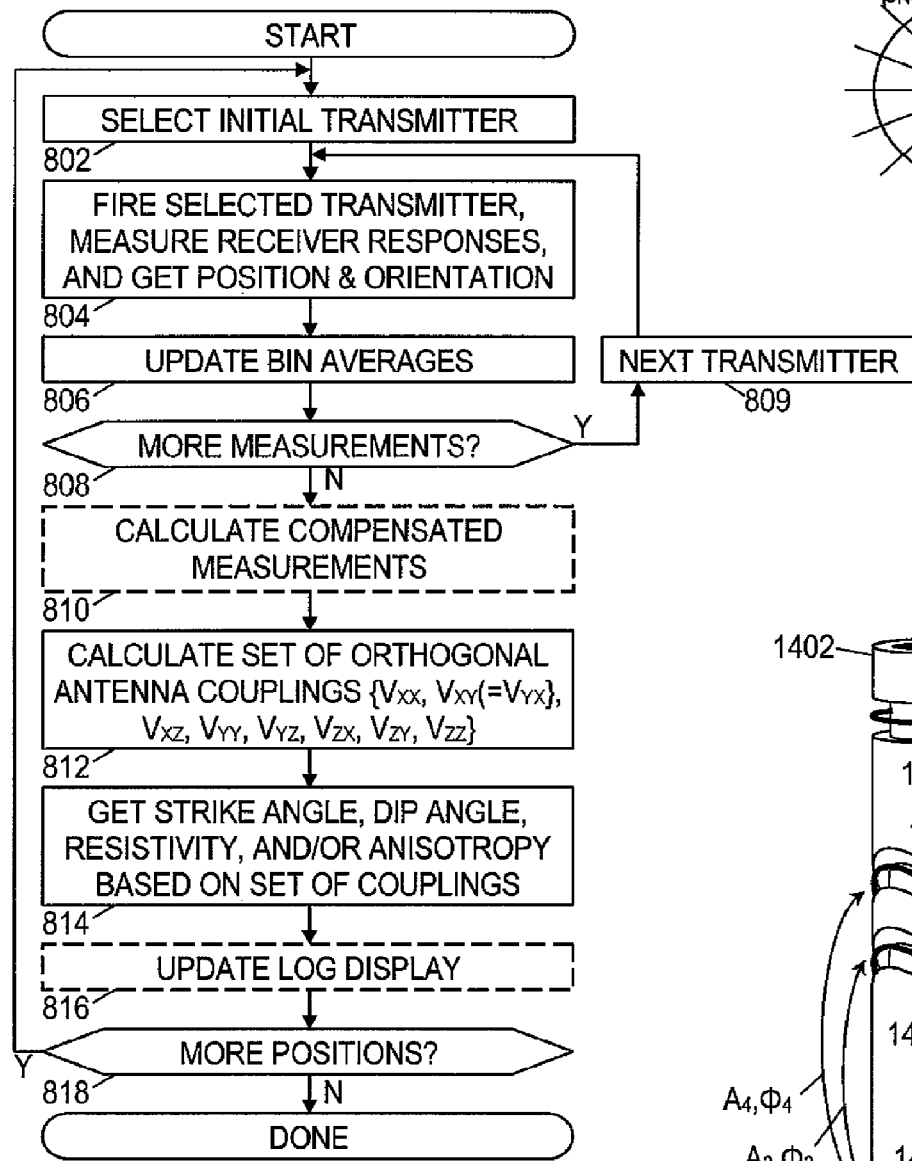
FIG. 8 is a flow diagram of an illustrative electromagnetic resistivity logging method.

FIG. 8 shows an illustrative logging method which may be performed by a downhole controller, by a surface computing facility that receives measurements from the tool, or performed cooperatively by both. In block 802 an initial transmitter is selected. (Multi-transmitter tools are discussed further below.) In block 804, the selected transmitter is fired, and the amplitude and phase of each receiver's response is measured. The tool's position and orientation are also captured and used to associate the receiver response measurements with an azimuthal bin. (An azimuthal bin has both an angular extent and an axial extent.) In block 806, the current measurements are used to update the average response for each receiver for the given bin.

In block 808, a test is made to determine whether additional measurements are needed or will be forthcoming at the current borehole position. For example, in tools having multiple transmitters, it is desired to have measurements from each transmitter. Other reasons for needing additional measurements include having a desired number of measurements within each azimuthal bin before additional processing is performed, or having at least a given number of azimuthally different measurements before additional processing is performed. If additional measurements at the current position are expected, the additional processing may be postponed until all the relevant measurements have been collected.

Once a sufficient number of measurements have been obtained at a given position in the borehole, the method continues with optional block 810. In block 810, compensated measurements are calculated. Compensation is most suitable for differential receiver configurations like that shown in FIG. 14. Tool 1402 includes a pair of receivers 1410, 1412 located between equally spaced transmitters 1408, 1414. In response to the firing of the first transmitter 1408, receivers 1410 and 1412 detect attenuation and phase shift values $A_1,\Phi_1$ and $A_2,\Phi_2$, from which differential measurements can be determined (e.g., $(\Phi_2-\Phi_1)$, or $(\log A_1-\log A_2)$). In response to the firing of the second transmitter 1414, receivers 1410 and 1412 detect attenuation and phase shift values $A_4,\Phi_4$ and $A_3,\Phi_3$, from which differential measurements can be determined (e.g., $(\Phi_4-\Phi_3)$). In each azimuthal bin, the differential measurement responses to the opposing transmitters can then be averaged together to obtain a compensated measurement, i.e., a measurement in which fixed biases in the electronics are canceled.

In block 812, the orthogonal antenna couplings are calculated based on the compensated measurements or on the average differential or average absolute measurements of attenuation and phase shift in each azimuthal bin. A least squares solution to a linear system of equations (such as that provided in equations 5.1 through 5.2N above) is calculated to find these coupling values. In block 814, the formation parameters of interest are calculated based on the orthogonal antenna couplings. The calculation of formation parameters may employ simultaneous inversion, or alternatively, some of the formation parameters may be fixed using outside information, thereby simplifying the solution process for the remaining parameters.

In optional block 816, a real-time log of one or more formation parameters (e.g., horizontal resistivity and anisotropy) is updated with the newly calculated parameter values from block 814. The log associates the calculated values with a depth or axial position within the borehole. Optionally, the information may also be associated with azimuthal orientations to generate a borehole image of azimuthal resistivity.

In block 818 a check is made to determine if logging information is available (or will become available) for additional positions within the borehole. If so, the process begins again with block 802. Otherwise, the process terminates.

FIGS. 7, 9-12 and 14 show various antenna configurations for illustrative electromagnetic resistivity logging tools that may be suitable alternatives for a multi-component logging tool such as that described with respect to FIG. 4. In FIG. 7, the tool includes a single tilted transmitter antenna 704 and at least one tilted receiver antenna 712 that is parallel to the transmitter antenna. The use of only a single tilted transmitter and receiver antenna orientation enables the determination of the diagonal coupling matrix components, and under assumptions of cross-component equality, enables the determination of the cross-coupling components too. However, in a preferred embodiment, a second tilted receiver antenna 710 is provided to enable determination of cross-coupling components while only assuming that the XY and YX components are equal. Thus tools having a single transmitter and two receiver antenna orientations (or a single receiver and two transmitter antenna orientations) may provide the best tradeoff between complexity and completeness.

Tool 702 may have several variations. In a first variation, the roles of transmitter and receiver are exchanged, so that transmitters coils 710 and 712 are alternately fired and the response of receiver coil 704 is measured. As additional variations, the crossed antenna coils 710 and 712 may be equally spaced in opposite directions from the antenna coil 704. Antenna coils 710 and 712 may retain their role as receivers responding to signals from transmitter coil 704, or the roles may again be exchanged.

Tool 702 is intended for absolute measurements (i.e., attenuation and phase shift are measured relative to the transmit signal). FIG. 9 shows an illustrative tool 902 intended for compensated differential measurements with different transmitter-receiver spacings. Tilted receiver coils 910 and 912 are parallel, and may have a tilt angle of about 45° and a spacing of about 8 inches. A first pair of parallel transmitters coils 908 and 914 are equally spaced from the receiver coil midpoint by about 32 inches, and are shown oriented parallel to the receiver antennas. In an alternative embodiment, the parallel transmitter coils 908 and 914 may have any tilt angle, including a tilt angle of zero (co-axial orientation). A second pair of transmitter coils 904 and 916 are equally spaced from the receiver coil midpoint by about 48 inches, and are parallel to the first pair of transmitter coils. The greater transmitter-receiver spacing enables the electromagnetic signals to provide measurements at greater penetration depths, enabling more accurate formation resistivity measurements. Since all of the transmitter coils are parallel and the receiver coils are parallel, tool 902 offers only a single transmitter antenna orientation and a single receiver orientation, meaning that the full coupling matrix can be determined only with a presumption of cross-coupling equalities. In one variation, tool 902 employs only a single receiver to absolute rather than differential measurements.

FIG. 10 shows an illustrative tool 1002 which also has parallel transmitter coils and parallel receiver coils in an antenna arrangement intended for making compensated differential measurements. The parallel receiver coils 1010 and 1012 are shown having a tilt of about 45° in an azimuth opposite to that of the transmitter coils. However, since only a single transmitter antenna orientation and a single receiver antenna orientation are provided, tool 1002 can enable determination of the full coupling matrix only with a presumption of cross-coupling equalities. In one uncompensated variation, tool 1002 omits transmitter coils 914 and 916.

FIG. 11 shows an illustrative tool 1102 having parallel transmitter coils, but having receiver coils 1110 and 1112 tilted about 45° in opposite azimuthal directions. Since tool 1102 provides two receiver orientations, determination of the full coupling matrix is possible. The configuration of tool 1102 enables compensated differential measurements to be performed. In an uncompensated variation, transmitters coils 914 and 916 are omitted.

FIG. 12 shows an illustrative tool 1202 having two transmitter antenna orientations and two receiver antenna orientations. Receiver antennas 1210 and 1212 are co-located and tilted about 45° in opposite azimuthal directions. A first transmitter coil pair includes transmitter coils 1208 and 914 equally spaced in opposite axial directions from the receiver antennas by about 32 inches, and a second transmitter coil pair includes coils 1204 and 916 equally spaced in opposite axial directions from the receiver antennas by about 48 inches. Each transmitter coil pair has transmitter coils tilted in opposite azimuthal directions. The configuration of FIG. 12 may be employed to make compensated differential measurements. In a non-differential variation, one of the receiver coils is omitted. In a second variation, the transmitter and receiver roles are exchanged, possibly with the omission of coil 1212. The role exchange between transmitter and receiver coils may be performed for each of the illustrative tools disclosed herein.

Figure 14:
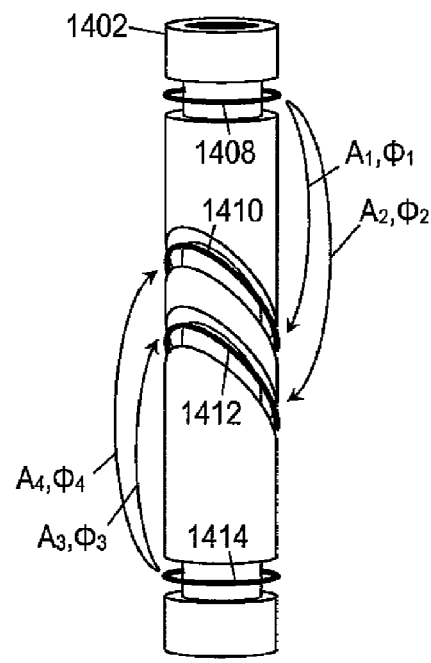
FIG. 14 shows an illustrative electromagnetic resistivity logging tool having compensated measurements.

FIG. 14 shows an illustrative tool 1402 having a pair of parallel tilted receiver antennas 1410 and 1412, with a pair of parallel co-axial transmitter antennas 1402 and 1414 equally spaced from the midpoint of the receiver antennas. Though this and other disclosed antenna configurations have only a single transmitter orientation and a single receiver orientation, they are nevertheless sensitive to anisotropy in dipping beds and can be used to calculate the alisotropy.

As previously mentioned, components of the coupling matrix C may be used as a basis for geosteering. With a properly oriented borehole coordinate system, the z-axis is indicative of the direction to the bed boundary, and the $C_{XZ}$ and $C_{ZX}$ components are useful for determining the boundary's proximity.

Numerous variations and modifications will become apparent to those skilled in the art once the above disclosure is fully appreciated. For example, the foregoing disclosure describes numerous antenna configurations in the context of a logging while drilling tool, such antenna configurations can also be readily applied to wireline logging tools. Furthermore, the principle of reciprocity can be applied to obtain equivalent measurements while exchanging transmitter and receiver roles for each antenna. It is intended that the following claims be interpreted to embrace all such variations and modifications.

What is claimed is:

1. An electromagnetic resistivity logging tool that comprises:
    a rotational position sensor;
    at least one transmitter antenna;
    a first receiver antenna at a first receiver antenna orientation; and
    a second receiver antenna at a second, different receiver antenna orientation; and
    a processor to receive at least one of a phase and amplitude measurement for each of the receiver antennas at each of a plurality of azimuthal angles to calculate at least one component of a coupling matrix using only receiver antennas having the first and second receiver antenna orientations.

2. The tool of claim 1, wherein the processor calculates at least seven components of the coupling matrix using only receiver antennas having the first and second receiver antenna orientations.

3. The tool of claim 2, wherein the processor further determines the seven components of the coupling matrix using only transmitter antennas having the same orientation as said at least one transmitter antenna.

4. The tool of claim 1, wherein the processor averages measurements in bins associated with each of the plurality of azimuthal angles and determines the coupling matrix components from the average measurements.

5. The tool of claim 1, wherein the processor determines the coupling matrix components based on a linear system of equations that express a dependence of each receiver's response on azimuthal angle.

6. The tool of claim 1, wherein the coupling matrix components are used to determine a log of a formation parameter for storage or display.

7. The tool of claim 5, wherein the formation parameter is in a set consisting of anisotropy and vertical resistivity.

8. The tool of claim 5, wherein the formation parameter is a formation dip angle.

9. The tool of claim 1, wherein the processor determines a geosteering signal based at least in part on the $C_{XZ}$ or $C_{ZX}$ component of the coupling matrix.

* * * * *